United States Patent [19]

Hira

[11] 4,355,842
[45] Oct. 26, 1982

[54] KICKING PLATE MOUNTING STRUCTURE

[75] Inventor: Kazumi Hira, Fujisawa, Japan

[73] Assignee: Nissan Motor Co., Ltd., Yokohama, Japan

[21] Appl. No.: 190,379

[22] Filed: Sep. 24, 1980

[30] Foreign Application Priority Data

Sep. 25, 1979 [JP] Japan .......................... 54-132843[U]

[51] Int. Cl.³ .............................................. B60R 3/00
[52] U.S. Cl. .................................. 296/199; 280/164 A
[58] Field of Search ............... 296/199, 216; 280/163, 280/164 A

[56]  References Cited

U.S. PATENT DOCUMENTS

| 1,679,796 | 8/1928 | Spiro | 280/163 |
|---|---|---|---|
| 1,865,766 | 7/1932 | Ketcham | 280/163 |
| 1,901,869 | 3/1933 | Duffy | 280/163 |
| 2,132,471 | 10/1938 | Hoffman | 280/163 |
| 2,208,723 | 7/1940 | Doty | 296/199 |
| 2,218,814 | 10/1940 | Duffy | 296/199 |
| 2,240,181 | 4/1941 | Fairbank | 296/199 |
| 3,726,559 | 4/1973 | Wilfert | 296/209 |
| 4,029,353 | 6/1977 | Barenyi | 296/209 |

FOREIGN PATENT DOCUMENTS 423891 2/1935 United Kingdom ............... 296/209

Primary Examiner—Joseph F. Peters, Jr.
Assistant Examiner—John A. Carroll

[57]  ABSTRACT

A side sill of a vehicle body includes outer and inner sill members which are welded to each other at upwardly projecting flanges, at least one of which is formed with a projection extending substantially horizontally. A kicking plate has an outer end portion which covers the upper surface of the outer sill member and which is secured thereto by clips made of plastics material. The inner end portion of the kicking plate is formed substantially as an inverted U-shaped cover which covers the flanges of the sill members. The cover has on its inner surface a projection which resiliently engages with the lower surface of the projection of at least one of the flanges.

6 Claims, 5 Drawing Figures

KICKING PLATE MOUNTING STRUCTURE

BACKGROUND OF THE INVENTION

1. Field of the Invention

The present invention relates to a structure for mounting a kicking plate onto a vehicle body panel forming the side sill at the lower edge of a door opening.

2. Description of Prior Art

Conventionally, as shown in FIGS. 1 and 2, the side sill 1 includes outer and inner sill members 1a and 1b which are welded to each other at upwardly projecting flanges 1a' and 1b'. A kicking plate 2 is provided to protect the outer and inner sill members, and has a generally flat outer end portion which is substantially parallel to the upper surface of the outer sill member, and which is secured thereto by clips 3 made of resilient material, such as plastics. An inner end portion of the kicking plate 2 is in the form of a substantially inverted U-shaped cover 2a which covers the flanges 1a' and 1b'. In order to secure the cover 2a to the flanges 1a' and 1b', substantially Ω-shaped clips 4 made of resilient material are arranged to straddle the flanges 1a' and 1b' and resiliently engage therewith. Each clip 4 is provided with sidewisely projecting lugs 4a and 4b which resiliently engage with opposite sides of the inner surface of the cover 2a. Outer surfaces of a floor panel 5 and the inner sill member 1b are covered by a carpet 6 which extends as far as the flange 1b'. The lower end of the cover 2a which is on the side of the vehicle cabin is in contact with, or slightly above the carpet 6 depending on the thickness of the carpet.

The above-described conventional arrangement encounters the following disadvantages. Firstly, a plurality of separate clips 4 have to be mounted on the inner surface of the cover one by one so that their assembly is time consuming and relatively expensive. As the clips 4 are held in position, in relation to the cover 2 as well as to the flanges 1a' and 1b', by their own resiliency only, the clips 4 are unable to positively hold the kicking plate 2 in position. Particularly, the clips 4 are liable to disengage from the flanges 1a' and 1b' when the side surfaces of the flanges are uneven or corrugated due to the deformation at the time of spot-welding, or when a thick carpet 6 exerts an upward pressure on the cover 2a.

SUMMARY OF THE INVENTION

Therefore, it is an object of the present invention to provide an improved structure for mounting the kicking plate to the side sill of the vehicle body, which is simple and less expensive in construction, and which allows the kicking plate to be mouned in position very easily and positively.

According to the present invention, there is provided a structure for mounting a kicking plate onto a vehicle body panel forming the side sill at the lower edge of a door opening, said vehicle body panel including outer and inner sill members which are welded to each other at upwardly projecting flanges, said kicking plate including an outer end portion which covers the upper surface of the outer sill member and which is secured thereto by a first mounting means, and an inner end portion formed substantially as an inverted U-shaped cover which covers said flanges of the sill members and which is secured thereto by a second mounting means, wherein said second mounting means comprises a first projection formed integrally with at least one of the flanges and protruding generally horizontally toward the inner surface of the cover, and a second projection formed on the inner surface of the cover such that the second projection resiliently engages with the lower surface of the first projection.

The present invention will now be described in detail by referring to some preferred embodiments shown in the drawings.

DESCRIPTION OF THE PREFERRED EMBODIMENTS

Figure 1:
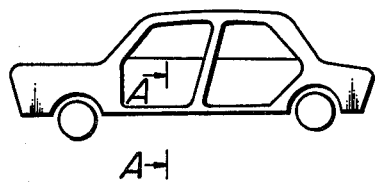
FIG. 1 is a schematic side view of a vehicle showing the location of a side sill to which the present invention may be applied.
Figure 2:
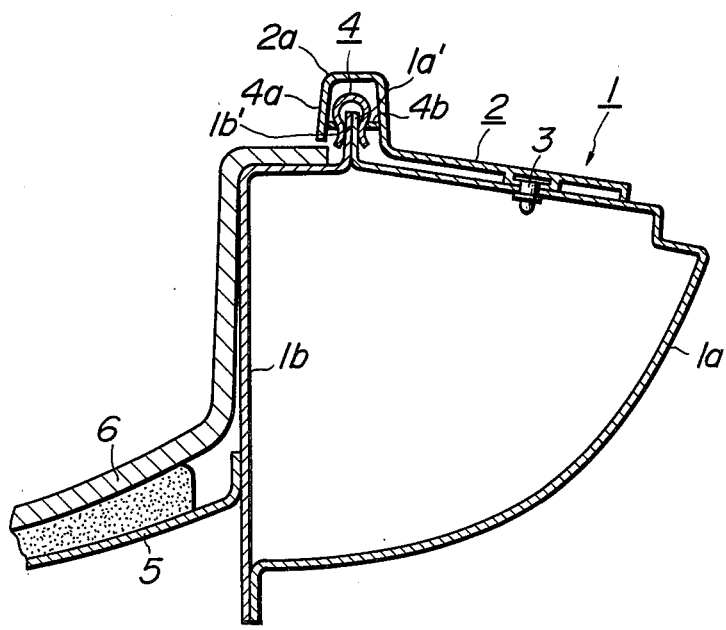
FIG. 2 is a sectional view in an enlarged scale taken generally along the line A—A of FIG. 1 and showing the above-mentioned conventional structure for mounting a kicking plate to the side sill of the vehicle.
Figure 3:
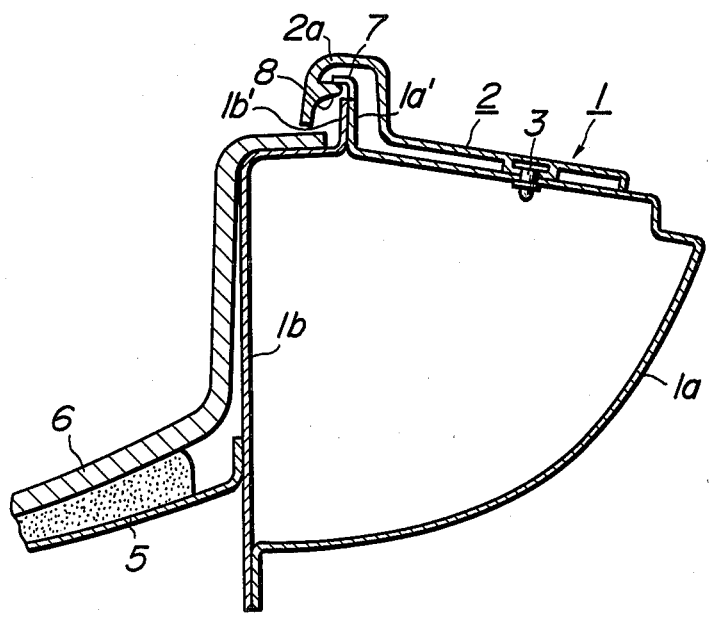
FIG. 3 is a sectional view similar to FIG. 2 but showing the kicking plate mounting structure according to one embodiment of the present invention.
Figure 4:
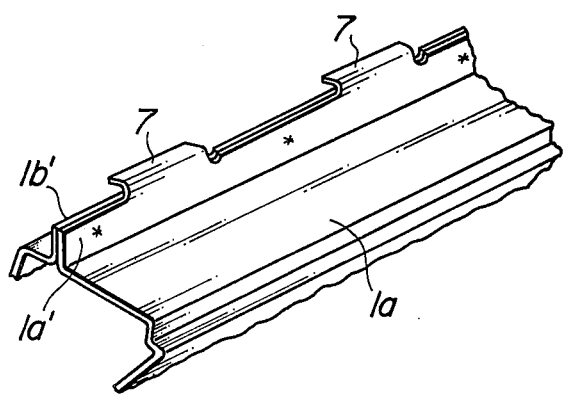
FIG. 4 is a perspective view of the vehicle body panel shown in FIG. 3.

Referring now to FIGS. 3 and 4, in which reference numerals used in FIG. 2 denote identical or corresponding elements, there is shown a mounting structure of the kicking plate according to one embodiment of the present invention.

The vehicle body panel forming the side sill 1, to which the present invention is applied, is generally the same as that shown in FIG. 2. Namely, as shown in FIG. 3, the side sill 1 includes outer and inner sill members 1a and 1b which are welded to each other at upwardly projecting flanges 1a' and 1b'. A kicking plate 2 covers the upper surface of the outer sill member 1a and is connected thereto, at its generally flat outer end portion, by clips 3. The kicking plate 2 has an inverted U-shaped cover 2a forming the inner end portion which covers the flanges 1a' and 1b'.

According to the present invention, as shown in FIG. 4, one of the flanges 1a' and 1b', e.g. the flange 1a, has a projection formed by locally extended top end portions 7 which are bent inwardly toward the cabin. Correspondingly, the cover 2a on its inner surface is integrally provided with a projection 8 in the form of a ridge extending longitudinally of the kicking plate and protruding toward the inwardly bent portions 7 of the flange 1a', such that the projection 8 resiliently engages with the lower surfaces of the bent portions 7.

With the above arrangement, since the inwardly bent portions 7 of the flange 1a' is in resilient engagement with the projection 8 of the cover 2a, the kicking plate 2 is positively held in position directly by the vehicle body panel forming the side sill, without using separate clips 4 as shown in FIG. 2.

Consequently, disengagement of the cover 2a of the kicking plate 2 from the flanges of the vehicle body panel is prevented, even when the side surfaces of the flanges 1a', 1b' are uneven or corrugated, or when a thick carpet 6 exerts an upward pressure on the cover 2a. Provision of the bent portions 7 and the projection 8 eliminates unstable separate clips 4 and facilitates the mounting operation of the kicking plate 2. By this, the number of steps and cost of the manufacture can be substantially reduced.

Figure 5:
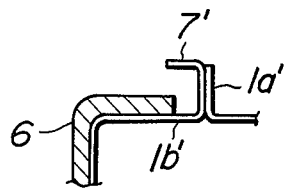
FIG. 5 is a fragmentary sectional view of another embodiment of the present invention.

The inwardly bent portion, which resiliently engages with the projection 8 on the inner surface of the cover 2a, may be formed by locally extended top portions 7' of the inner sill member 1b, as shown in FIG. 5.

Since the top end portions 7 or 7' of the flange 1a' or 1b' are bent inwardly toward the cabin of the vehicle, the projection 8 is formed on that side of the cover 2a which is remote from the clips 3 so that the projection 8 has a sufficient flexibility when engaging with the bent portions 7 or 7'.

The bent portions 7 of the flange 1a' may be formed such that the top end of the flange 1b' contacts the lower surface of the bent portions 7. In this case, the positioning of the inner sill member 1b with respect to the outer sill member 1a, at the time of welding them to each other, can be effected easily.

Generally, the sill members 1a and 1b consist of metallic sheet material. Thus, provision of a plurality of bent portions 7 which are spaced from each other serves to reduce the weight. However, when the sill members consist of fiber reinforced plastics material, a continuous projection may preferably be formed instead of the bent portions 7, since such members are extrusion molded and reduction of weight is not so important.

As the kicking plate consists of plastics material, and is manufactured by extrusion molding, the projection 8 shown in FIG. 3 is in the form of a continuous ridge. However, if necessary, a plurality of such projections may be formed on the inner surface of the cover 2a, so that each projection corresponds to each bent portion of the flange 1a.

As appreciated from the foregoing description, the kicking plate mounting structure according to the present invention is simple and less expensive in construction, and serves to mount the kicking plate in position very easily and positively.

What is claimed is:

1. In a structure for mounting a kicking plate onto a vehicle body panel forming the side sill at the lower edge of a door opening, said vehicle body panel including outer and inner sill members which are welded to each other at upwardly projecting flanges, said kicking plate including an outer end portion which covers the substantially horizontal upper surface of the outer sill member and which is secured thereto by a first mounting means, and an inner end portion formed substantially as an inverted U-shaped cover which covers said flanges of the sill members and which is secured thereto by a second mounting means, the improvement wherein said second mounting means comprises a first projection formed integrally with at least one of the flanges and protruding generally horizontally toward the inner surface of the cover, and a second projection formed on the inner surface of the cover such that the second projection resiliently engages with the lower surface of the first projection.

2. The structure as claimed in claim 1, wherein said first projection protrudes inwardly toward the cabin of the vehicle.

3. The structure as claimed in claim 1, wherein said first projection is formed by the top portion of one of the flanges, which is bent substantially horizontally, and in contact with the top portion of the other of the flanges.

4. The structure as claimed in claim 3, wherein a plurality of said first projections are formed on said one of the flanges, said first projections being spaced from each other.

5. The structure as claimed in claim 1, wherein said kicking plate consists of plastics material, said second projection being in the form of a ridge extending longitudinally of the kicking plate.

6. The structure as claimed in claim 1, wherein said first mounting means comprises clips consisting of resilient material.

* * * * *